(12) United States Patent
Bialik et al.

(10) Patent No.: US 10,578,509 B2
(45) Date of Patent: Mar. 3, 2020

(54) SYSTEMS AND METHODS FOR VERIFYING SEALING INTEGRITY IN PORTABLE ELECTRONIC DEVICES

(71) Applicant: MOTOROLA SOLUTIONS, INC., Chicago, IL (US)

(72) Inventors: Evgeny Bialik, Rishon Lezion (IL); Asaf Rafid, Jerusalem (IL); Yaakov Moseri, Shoham (IL); Gleb Korenzvit, Rishon Lezion (IL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 319 days.

(21) Appl. No.: 15/670,677

(22) Filed: Aug. 7, 2017

(65) Prior Publication Data

US 2019/0041291 A1 Feb. 7, 2019

(51) Int. Cl.
*G01M 3/00* (2006.01)
*G01M 3/02* (2006.01)

(52) U.S. Cl.
CPC .............. *G01M 3/002* (2013.01); *G01M 3/02* (2013.01)

(58) Field of Classification Search
CPC ................................ G01M 3/002; G01M 3/02
USPC .............. 374/45, 104, 105, 143; 702/35, 40; 252/964
See application file for complete search history.

(56) References Cited

U.S. PATENT DOCUMENTS

| 10,132,712 | B1* | 11/2018 | Zhang ................... G01M 3/002 |
| 2014/0230525 | A1* | 8/2014 | Willemin .............. G01M 3/002 73/49.3 |
| 2017/0049164 | A1 | 2/2017 | Gruentzig |

* cited by examiner

*Primary Examiner* — Natalie Huls
*Assistant Examiner* — Janice M Soto
(74) *Attorney, Agent, or Firm* — Michael Best & Friedrich LLP

(57) ABSTRACT

Systems and methods for verifying sealing integrity in a portable electronic device. One method includes raising, with an electronic processor, an internal temperature of the portable electronic device. The method includes, when the internal temperature exceeds a threshold, determining whether a vent port of the portable electronic device is closed. The method includes, when the vent port is closed, receiving, from a pressure sensor, a first internal pressure for the portable electronic device. The method includes, after a cool down period has elapsed, receiving, from the pressure sensor, a second internal pressure for the portable electronic device. The method includes determining, based on the first and second internal pressures, a pressure drop rate. The method includes determining a sealing integrity indication based on the pressure drop rate. The method includes providing a test result output based on the sealing integrity indication.

20 Claims, 2 Drawing Sheets

SYSTEMS AND METHODS FOR VERIFYING SEALING INTEGRITY IN PORTABLE ELECTRONIC DEVICES

BACKGROUND OF THE INVENTION

Portable electronic devices, for example, portable two-way radios, are often used outdoors and in adverse weather conditions. In some cases, such devices are used for public safety, military, utility, or other work where enhanced reliability is desired. As a consequence, many portable electronic devices feature sealed housings, which protect against the intrusion of water, dust, or other foreign bodies.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
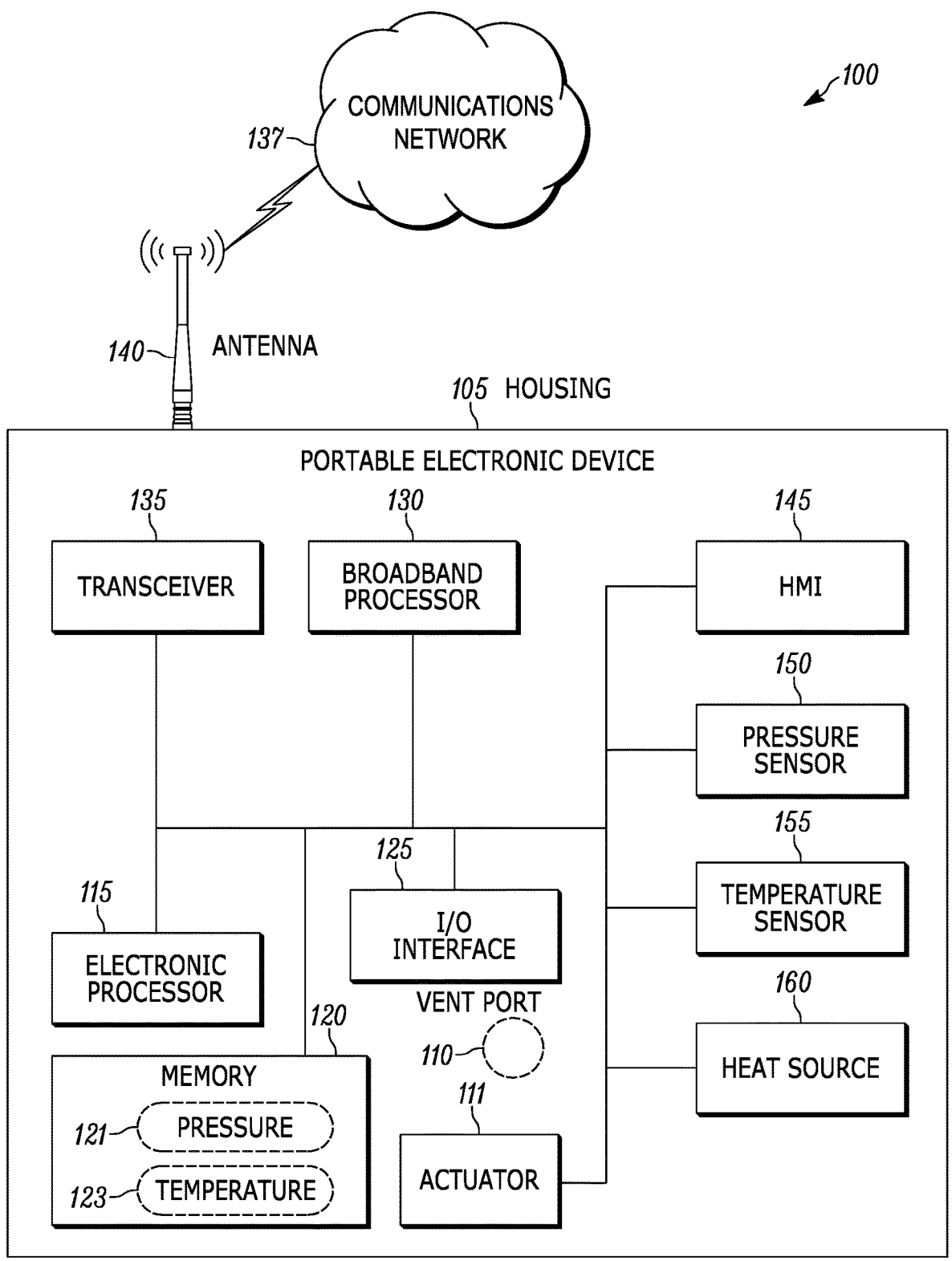
FIG. 1 is a diagram of a portable electronic device in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

As noted, portable electronic devices may have sealed housings, which protect against the intrusion of water, dust, or the like. Varied levels of protection are available. For example, the International Electrotechnical Commission (IEC) publishes the 60529 standard, which classifies and rates the degree of protection provided against dust, water, and the like. Regardless of the protection level provided for a device, maintaining the integrity of the seal compliant with the specified rating is important to proper functioning of the device.

Without testing, a failed seal may only be discovered when a device malfunctions, for example because of water ingress or other intrusions. To address this concern, external diagnostic fixtures are used to test the seal integrity of portable electronic devices. However, such fixtures may be complicated and expensive, and require taking the devices out of service for testing. Another current approach requires users to apply mechanical pressure (for example, with a finger) to a touch screen of a device to increase internal air pressure and test seal integrity. However, this method is inaccurate because the force applied may vary from user to user. Further, the pressure applied may not be high enough to test some specified standards. For example, the IPX7 standard requires 10 KPa of pressure for testing. Accordingly, systems and methods are provided herein for, among other things, embedded sealing diagnostics for sealed portable electronic devices.

One example embodiment provides a system for verifying sealing integrity in a portable electronic device. The system includes a pressure sensor and an electronic processor communicatively coupled to the pressure sensor. The electronic processor is configured to raise an internal temperature of the portable electronic device. The electronic processor is configured to, when the internal temperature exceeds a threshold, determine whether a vent port of the portable electronic device is closed. The electronic processor is configured to, when the vent port is closed, receive, from the pressure sensor, a first internal pressure for the portable electronic device. The electronic processor is configured to, after a cool down period has elapsed, receive, from the pressure sensor, a second internal pressure for the portable electronic device. The electronic processor is configured to determine, based on the first and second internal pressures, a pressure drop rate. The electronic processor is configured to determine a sealing integrity indication based on the pressure drop rate. The electronic processor is configured to provide a test result output based on the sealing integrity indication.

Another example embodiment provides a method for verifying sealing integrity in a portable electronic device. The method includes raising, with an electronic processor, an internal temperature of the portable electronic device. The method includes, when the internal temperature exceeds a threshold, determining whether a vent port of the portable electronic device is closed. The method includes, when the vent port is closed, receiving, from a pressure sensor, a first internal pressure for the portable electronic device. The method includes, after a cool down period has elapsed, receiving, from the pressure sensor, a second internal pressure for the portable electronic device. The method includes determining, based on the first and second internal pressures, a pressure drop rate. The method includes determining a sealing integrity indication based on the pressure drop rate. The method includes providing a test result output based on the sealing integrity indication.

Another example embodiment provides a portable communications device. The portable communications device includes a pressure sensor, a temperature sensor, and an electronic processor communicatively coupled to the temperature sensor and the pressure sensor. The electronic processor is configured to raise an internal temperature of the portable communications device. The electronic processor is configured to receive, from the temperature sensor, a first temperature. The electronic processor is configured to, when the internal temperature exceeds a threshold, generate a prompt to close a vent port of the portable communications device. The electronic processor is configured to receive, from the pressure sensor, a first internal pressure for the portable electronic device. The electronic processor is configured to, after a cool down period has elapsed, receive, from the pressure sensor, a second internal pressure for the portable communications device and receive, from the temperature sensor, a second temperature for the portable communications device. The electronic processor is configured to determine, based on the first and second internal pressures, and the first and second temperatures a pressure drop rate. The electronic processor is configured to determine a sealing integrity indication based on the pressure drop rate.

The electronic processor is configured to provide a test result output based on the sealing integrity indication.

For ease of description, some or all of the example systems presented herein are illustrated with a single exemplar of each of its component parts. Some examples may not describe or illustrate all components of the systems. Other example embodiments may include more or fewer of each of the illustrated components, may combine some components, or may include additional or alternative components.

FIG. 1 illustrates an example portable electronic device 100. The portable electronic device 100 includes a housing 105, which encloses some or all of the components of the portable electronic device 100. In some embodiments, the housing 105 is manufactured from plastic using injection molding. In other embodiments, the housing 105 is manufactured using other suitable materials or methods. The housing 105 is sealed to protect against water ingress and particle intrusion. In some embodiments, the housing 105 is sealed compliant with an International Electrotechnical Commission (IEC) 60529 standard (for example, IPX7). The housing 105 includes a vent port 110. The vent port 110 is positioned in the housing to allow for air pressure equalization, while maintaining the compliance with the applicable water ingress standard. The vent port 110 is user-accessible, such that a user of the portable electronic device 100 can seal the vent port 110, temporarily rendering the housing 105 airtight (assuming a still properly-functioning seal), as described below. For example, as described below, a user may be prompted to seal the vent port 110 manually with an additional accessory or part of the portable electronic device 100 (not shown). In some embodiments, the sealing accessory is separate from the portable electronic device 100 (that is, not attached permanently to the portable electronic device 100). In some embodiments, the sealing accessory is attached to the portable electronic device 100 as part of device's assembly or the housing 105. In some embodiments, an actuator 111 (for example, a motor, a solenoid, or the like) is provided, which is positioned to seal the vent port 110 when activated, as described below.

In the embodiment illustrated, the portable electronic device 100 includes an electronic processor 115, a memory 120, an input/output interface 125, a baseband processor 130, a transceiver 135, an antenna 140, a human machine interface (HMI) 145, a pressure sensor 150, a temperature sensor 155, and a heat source 160. The illustrated components, along with other various modules and components are coupled to each other by or through one or more control or data buses that enable communication therebetween. The use of control and data buses for the interconnection between and exchange of information among the various modules and components would be apparent to a person skilled in the art in view of the description provided herein.

The electronic processor 115 obtains and provides information (for example, from the memory 120 and/or the input/output interface 125), and processes the information by executing one or more software instructions or modules, capable of being stored, for example, in a random access memory ("RAM") area of the memory 120 or a read only memory ("ROM") of the memory 120 or another non-transitory computer readable medium (not shown). The software can include firmware, one or more applications, program data, filters, rules, one or more program modules, and other executable instructions. The electronic processor 115 is configured to retrieve from the memory 120 and execute, among other things, software related to the control processes and methods described herein.

The memory 120 can include one or more non-transitory computer-readable media, and includes a program storage area and a data storage area. As used in the present application, "non-transitory computer-readable media" comprises all computer-readable media but does not consist of a transitory, propagating signal. The program storage area and the data storage area can include combinations of different types of memory, as described herein. In the embodiment illustrated, the memory 120 stores, among other things, pressure data 121 and temperature data 123 for the portable electronic device 100 (both collected and processed as described in detail below).

The input/output interface 125 is configured to receive input and to provide system output. The input/output interface 125 obtains information and signals from, and provides information and signals to, (for example, over one or more wired and/or wireless connections) devices both internal and external to the portable electronic device 100.

The electronic processor 115 is configured to control the baseband processor 130 and the transceiver 135 to transmit and receive data to and from the portable electronic device 100. The baseband processor 130 encodes and decodes digital data sent and received by the transceiver 135. The transceiver 135 transmits and receives radio signals to and from, for example, a communications network 137 using the antenna 140. The electronic processor 115, the baseband processor 130, and the transceiver 135 may include various digital and analog components, which for brevity are not described herein and which may be implemented in hardware, software, or a combination of both. Some embodiments include separate transmitting and receiving components, for example, a transmitter and a receiver, instead of a combined transceiver 135.

In some embodiments, the portable electronic device 100 is communicatively coupled to other electronic or computing devices (for example, a remote server) via the communications network 142. The communications network 142 is a communications network including wireless and wired connections. The communications network 142 may be implemented using a wide area network, such as the Internet, a local area network, such as a Bluetooth™ network or Wi-Fi, a Long Term Evolution (LTE) network, a Global System for Mobile Communications (or Groupe Special Mobile (GSM)) network, a Code Division Multiple Access (CDMA) network, an Evolution-Data Optimized (EV-DO) network, an Enhanced Data Rates for GSM Evolution (EDGE) network, a 3G network, a 4G network, and combinations or derivatives thereof.

The human machine interface (HMI) 145 receives input from, and provides output to, users of the portable electronic device 100. The HMI 145 may include a keypad, switches, buttons, soft keys, indictor lights (for example, light emitting diodes (LEDs), haptic vibrators, a display (for example, a touchscreen), or the like. In some embodiments, the HMI 145 includes a suitable display such as, for example, a liquid crystal display (LCD) touch screen, or an organic light-emitting diode (OLED) touch screen. In such embodiments, the portable electronic device 100 implements a graphical user interface (GUI) (for example, generated by the electronic processor 115, from instructions and data stored in the memory 120, and presented on the display of the HMI 145), that enables a user to interact with and control the portable electronic device 100.

The pressure sensor 150 is a barometric pressure sensor (for example, a piezo-resistive sensor) positioned within the housing 105 to sense the internal pressure of the portable electronic device 100. The pressure sensor 150 transmits electrical signals representative of the sensed internal pressure to the electronic processor 115. The electronic processor 115 processes the electrical signals received from the pressure sensor 150 to determine a value (for example, in KPa) for the internal pressure of the portable electronic device 100.

The temperature sensor 155 (for example, a thermocouple, thermistor, or the like) is positioned within the housing 105 to sense the internal temperature of the portable electronic device 100. The temperature sensor 155 transmits electrical signals representative of the sensed internal temperature to the electronic processor 115. The electronic processor 115 processes the electrical signals received from the temperature sensor 155 to determine a value (for example, in ° C.) for the internal temperature of the portable electronic device 100. In some embodiments, the temperature sensor 155 may be integrated in the electronic processor 115 or another suitable component of the portable electronic device 100.

The heat source 160 is an electronic component (for example, a resistor) which is controlled by the electronic processor 115 to generate heat (for example, by controlling a current flow to the heat source 160).

In some embodiments, the portable electronic device 100 is a portable communications device. The portable communications device may be a handheld LTE device (for example, a Motorola Solutions® LEX L10). In other embodiments, the portable electronic device 100 may be smart telephone, a portable two-way radio, a body worn camera, or another portable or mobile electronic device containing software and hardware enabling it to operate as described herein.

Figure 2:
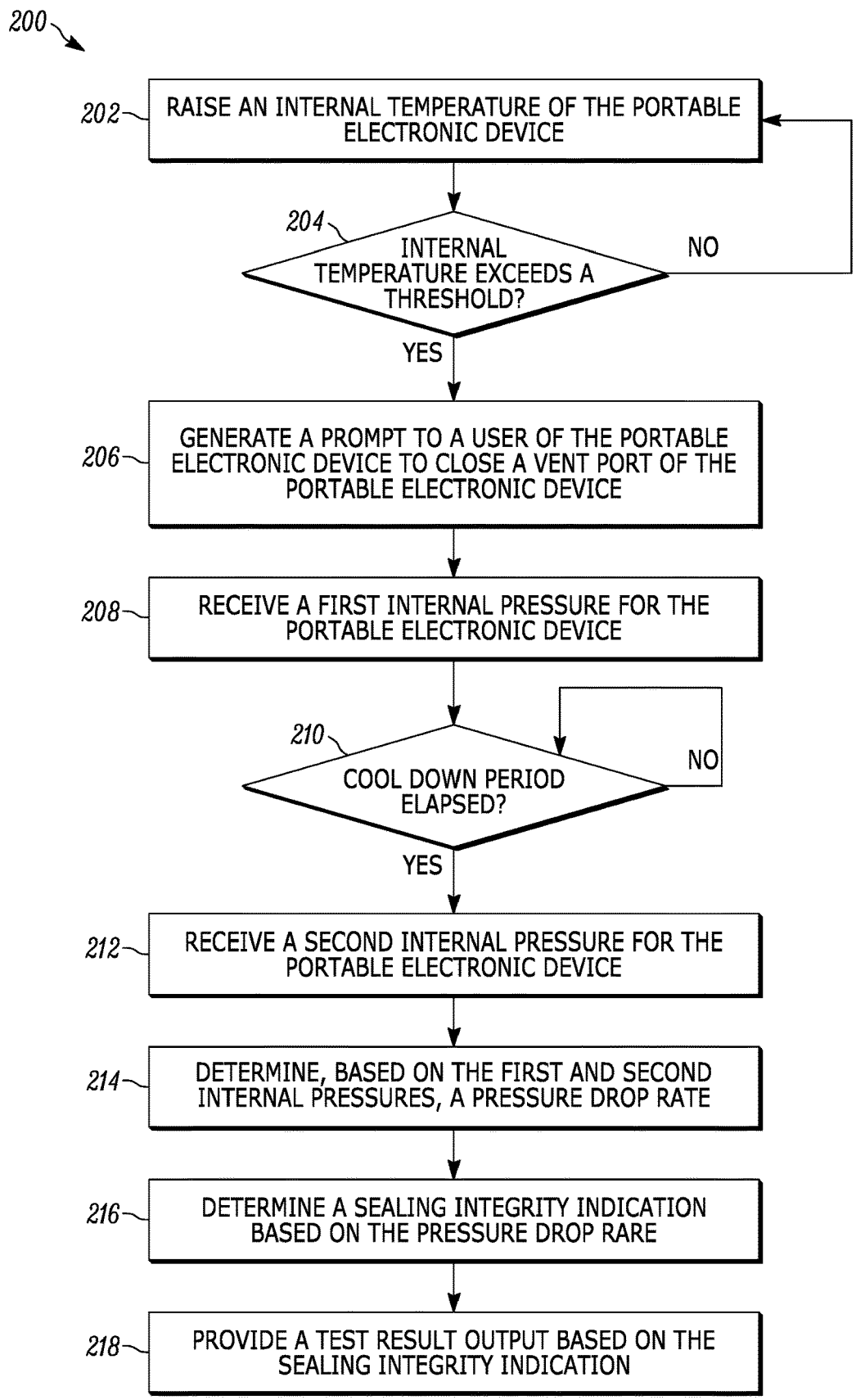
FIG. 2 is a flowchart of a method for verifying sealing integrity in the portable electronic device of FIG. 1 in accordance with some embodiments.

FIG. 2 illustrates an example method 200 for verifying sealing integrity in the portable electronic device 100. The method 200 is described as being performed by the portable electronic device 100 and, in particular, the electronic processor 115.

At block 202, the electronic processor 115 raises the internal temperature of the portable electronic device. In some embodiments, the electronic processor 115 raises the internal temperature by performing intensive processing operations, for example, complex mathematical operations. Such operations cause the processor itself to heat up. As the heat dissipates from the processor, it raises the air temperature inside of the portable electronic device 100. In some embodiments, the electronic processor 115 raises the internal temperature by controlling the heat source 160 to raise the internal temperature of the portable electronic device. For example, the electronic processor 115 may increase a current flow to a resistor to cause the resistor to heat up, in turn heating up the air inside the portable electronic device 100.

At block 204, the electronic processor 115 determines whether the internal temperature of the portable electronic device 100 exceeds a threshold. For example, the electronic processor 115 may receive from the temperature sensor 155 a temperature for the portable electronic device 100. As noted above, in some embodiments, the electronic processor 115 may determine the temperature using its own internal sensor. In some embodiments, the threshold is based on what change in temperature is required to achieve a 1 KPa rise in pressure over atmospheric pressure (for example, an approximately 3 degree Celsius increase in temperature). In some embodiments, the electronic processor 115 determines whether the internal temperature of the portable electronic device 100 exceeds a threshold based on an elapsed time. For example, it may be known for what period of time the electronic processor 115 should perform intensive operations or control the heat source 160 to raise the temperature by a desired amount. When such time period has elapsed, the electronic processor 115 may determine that the threshold has been exceeded.

At block 206, when the internal temperature of the portable electronic device 100 exceeds the threshold, the electronic processor 115 generates a prompt to a user of the portable electronic device 100 to close the vent port 110. In some embodiments, the prompt is a visual prompt (for example, displayed using a graphical user interface or an LED). In some embodiments, the prompt is a haptic feedback, for example, a vibration or sequence of vibrations. In some embodiments, the prompt is an audio prompt, for example, a beep or a spoken command. Some embodiments use combinations of the foregoing. The vent port may be covered with adhesive tape, a plug or cap, or another suitable means. In some embodiments, rather than prompting the user, the electronic processor 115 controls the actuator 111 to close the vent port of the portable electronic device (for example, by moving an internal plug or other sealing means into position). In some embodiments, the electronic processor 115 determines whether the vent port is closed before proceeding. For example, the electronic processor 115 may wait for a specified time. In another example, the electronic processor 115 may receive a confirmation (for example, input via the HMI 145 or feedback from the actuator 111) that the vent port has been covered or closed.

At block 208, the electronic processor 115 receives, from the pressure sensor 150, a first internal pressure for the portable electronic device 100 (for example, in KPa).

At block 210, the electronic processor 115 determines whether a cool down period has elapsed. As set forth in the equation below, the pressure of a given amount of gas held at constant volume is directly proportional to the temperature.

$$P \times V = nRT$$

where P=pressure, V=volume, T=temperature, n=Avogadro's Constant, and R=gas constant. Accordingly, assuming that the volume V remains constant between to pressure readings ($P_1$ and $P_2$) and two related temperature readings ($T_1$ and $T_2$), the second pressure reading ($P_2$) is related to the first pressure reading ($P_1$) using the following equation:

$$P_2 = (P_1 \times T_2)/T_1$$

Sealing the vent port 110, at block 206, assuming the seal of the housing 105 is still intact, results in a constant volume of air inside the portable electronic device 100. Accordingly, for a properly-sealed housing 105, the pressure should respond predictably based on changes in temperature. The cool down period allows for a change in temperature to occur that is sufficient to allow a measurable change in pressure to be detected (for example, based on the accuracy of the pressure sensor 150). In some embodiments, the cool down period is a length of time measured by the electronic processor 115. In some embodiments, the electronic processor 115 takes a second temperature reading to determine whether the change is sufficient.

Regardless of how it is measured, at block 212, after the cool down period has elapsed, the electronic processor 115 receives, from the pressure sensor 150, a second internal pressure for the portable electronic device 100. At block 214, the electronic processor 115 determines, based on the first and second internal pressure readings, a pressure drop rate. The pressure drop rate indicates how much the pressure inside the portable electronic device 100 has dropped over the cool down period. The pressure drop rate may be determined using the equations noted above. In some embodiments, the electronic processor 115 determines the pressure drop rate further based on the first and second temperatures readings.

At block 216, the electronic processor 115 determines a sealing integrity indication based on the pressure drop rate. In some embodiments, the electronic processor 115 compares the pressure drop rate to a known range of acceptable pressure drop rates for the particular portable electronic device 100, based on the sealing specification (for example, IPX7). For example, when the pressure drop rate is within the acceptable range, the sealing integrity indication indicates that the portable electronic device 100 has passed the sealing integrity test. When the pressure drop rate is outside the acceptable range, the sealing integrity indication indicates that the portable electronic device 100 has failed the sealing integrity test.

At block 218, the electronic processor 115 provides a test result output (for example, pass or fail) based on the sealing integrity indication. In some embodiments, the electronic processor 115 provides the test result output via the human machine interface. For example, the electronic processor 115 may display the result via a graphical user interface, by flashing an LED, by providing haptic vibration, with an audio signal, or some combination of the foregoing.

In some embodiments, the electronic processor 115 provides the test result output via the transceiver 135. For example, the result may be transmitted to a remote server at a command center or service center.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A system for verifying sealing integrity in a portable electronic device, the system comprising:
   a pressure sensor; and
   an electronic processor communicatively coupled to the pressure sensor, and configured to raise an internal temperature of the portable electronic device;

in response to determining that the internal temperature exceeds a threshold, determine whether a vent port of the portable electronic device is closed; and in response to determining that the vent port is closed,
receive, from the pressure sensor, a first internal pressure for the portable electronic device;
after a cool down period has elapsed, receive, from the pressure sensor, a second internal pressure for the portable electronic device;
determine, based on the first and second internal pressures, a pressure drop rate;
determine a sealing integrity indication based on the pressure drop rate; and
provide a test result output based on the sealing integrity indication.

2. The system of claim 1, wherein the electronic processor is further configured to generate a prompt to close the vent port.

3. The system of claim 2, wherein the prompt includes at least one selected from the group consisting of a visual prompt, a haptic feedback, and an audio prompt.

4. The system of claim 1, further comprising:
a temperature sensor;
wherein the electronic processor is communicatively coupled to the temperature sensor and configured to
receive, from the temperature sensor, a first temperature;
when the first temperature exceeds the threshold, generate a prompt to close the vent port of the portable electronic device;
after a cool down period has elapsed, receive, from the temperature sensor, a second temperature for the portable electronic device; and
determine the pressure drop rate further based on the first and second temperatures.

5. The system of claim 4, wherein the temperature sensor is integrated into the electronic processor.

6. The system of claim 1, wherein the electronic processor is further configured to perform intensive processing operations to raise the internal temperature of the portable electronic device.

7. The system of claim 1, further comprising:
a heat source;
wherein the electronic processor is communicatively coupled to the heat source and is further configured to control the heat source to raise the internal temperature of the portable electronic device.

8. The system of claim 1, further comprising:
an actuator;
wherein the electronic processor is communicatively coupled to the actuator and further configured to control the actuator to close the vent port of the portable electronic device.

9. The system of claim 1, further comprising:
a transceiver;
wherein the electronic processor communicatively coupled to the transceiver and is further configured to provide the test result output via the transceiver.

10. The system of claim 1, further comprising:
a human machine interface;
wherein the electronic processor communicatively coupled to the human machine interface and is further configured to provide the test result output via the human machine interface.

11. A method for verifying sealing integrity in a portable electronic device, the method comprising:
raising, with an electronic processor, an internal temperature of the portable electronic device;
in response to determining that the internal temperature exceeds a threshold, determining whether a vent port of the portable electronic device is closed; and
in response to determining that the vent port is closed,
receiving, from a pressure sensor, a first internal pressure for the portable electronic device;
after a cool down period has elapsed, receiving, from the pressure sensor, a second internal pressure for the portable electronic device;
determining, based on the first and second internal pressures, a pressure drop rate;
determining a sealing integrity indication based on the pressure drop rate; and
providing a test result output based on the sealing integrity indication.

12. The method of claim 11, further comprising:
generating a prompt to close the vent port of the portable electronic device.

13. The method of claim 11, further comprising:
receiving, from a temperature sensor, a first temperature;
when the first temperature exceeds the threshold, generating a prompt to close the vent port of the portable electronic device;
after the cool down period has elapsed, receiving, from the temperature sensor, a second temperature for the portable electronic device; and
wherein determining the pressure drop rate includes determining the pressure drop rate based on the first and second temperatures.

14. The method of claim 13, wherein receiving a first temperature and a second temperature includes receiving the first and second temperatures from a temperature sensor integrated into the electronic processor.

15. The method of claim 11, wherein raising the internal temperature of the portable electronic device includes performing, with the electronic processor, intensive processing operations.

16. The method of claim 11, wherein raising an internal temperature of the portable electronic device includes controlling a heat source.

17. The method of claim 11, further comprising:
controlling, with the electronic processor, an actuator to close the vent port of the portable electronic device.

18. The method of claim 11, wherein providing the test result output includes providing the test result output via a transceiver.

19. The method of claim 11, wherein providing the test result output includes providing the test result output via a human machine interface.

20. A portable communications device comprising:
a pressure sensor;
a temperature sensor; and
an electronic processor communicatively coupled to the temperature sensor and the pressure sensor, and configured to
raise an internal temperature of the portable communications device;
receive, from the temperature sensor, a first temperature;
when the internal temperature exceeds a threshold, generate a prompt to close a vent port of the portable communications device;

receive, from the pressure sensor, a first internal pressure for the portable communications device;

after a cool down period has elapsed, receive, from the pressure sensor, a second internal pressure for the portable communications device and receive, from the temperature sensor, a second temperature for the portable communications device;

determine, based on the first and second internal pressures, and the first and second temperatures a pressure drop rate;

determine a sealing integrity indication based on the pressure drop rate; and provide a test result output based on the sealing integrity indication.

* * * * *